(12) United States Patent
Sato

(10) Patent No.: US 6,171,573 B1
(45) Date of Patent: Jan. 9, 2001

(54) ALUMINA SOL, PROCESS FOR PREPARING THE SAME, PROCESS FOR PREPARING ALUMINA MOLDING USING THE SAME, AND ALUMINA-BASED CATALYST PREPARED THEREBY

(76) Inventor: Goro Sato, 2530, Oaza-Tonda, Wakamatsu-ku, Kitakyushu-shi, Fukuoka-ken, 808-01 (JP)

(*) Notice: Under 35 U.S.C. 154(b), the term of this patent shall be extended for 0 days.

(21) Appl. No.: 09/142,440

(22) PCT Filed: Mar. 4, 1997

(86) PCT No.: PCT/JP97/00663

§ 371 Date: Sep. 4, 1998

§ 102(e) Date: Sep. 4, 1998

(87) PCT Pub. No.: WO97/32817

PCT Pub. Date: Sep. 12, 1997

(30) Foreign Application Priority Data

Mar. 5, 1996  (JP) .................................................. 8-078227

(51) Int. Cl.⁷ ...................................................... C01F 7/02
(52) U.S. Cl. ........................ 423/626; 423/625; 423/628; 502/355
(58) Field of Search .................. 502/355, 415; 423/625, 628, 626; 516/94

(56) References Cited

U.S. PATENT DOCUMENTS

| | | | |
|---|---|---|---|
| 2,915,475 | * 12/1959 | Bugosh | 516/94 |
| 3,790,495 | * 2/1974 | Podschus . | |
| 4,172,809 | * 10/1979 | Triki . | |
| 4,555,394 | * 11/1985 | Asaoka et al. | 423/626 |
| 5,178,849 | * 1/1993 | Bauer | 423/626 |

FOREIGN PATENT DOCUMENTS

| | | |
|---|---|---|
| 0217428 | 4/1987 | (EP) . |
| 0394501 | 10/1990 | (EP) . |
| 0505896 | 3/1991 | (EP) . |
| 46-7164 | 12/1971 | (JP) . |
| 47-16395 | 9/1972 | (JP) . |
| 50-21319 | 7/1975 | (JP) . |
| 59-13446 | 3/1984 | (JP) . |
| 60-166220 | 8/1985 | (JP) . |
| 61-026512 | 2/1986 | (JP) . |
| 61-72624 | 4/1986 | (JP) . |
| 05024824 | 2/1993 | (JP) . |
| 06104568 | 4/1994 | (JP) . |
| 53-31477 | 9/1994 | (JP) . |
| 07010535 | 1/1995 | (JP) . |

OTHER PUBLICATIONS

Buining, Paul A., et al., "Preparation of Colloidal Boehmite Needles by Hydrothermal Treatment of Aluminum Alkoxide Precurosors", *J. Am. Ceram. Soc.*, vol. 74, No. 6 (1991), pp. 1303–1307.

Buining, Paul A., et al., "Effect of Hydrothermasl Conditions on Morphology of Colloidal Boehmite Particles: Implications for Fibril Formation and Monodispersity", *J. Am. Ceram. Soc.,* Vol. 73, No. 8, pp. 2385–2390 (1990).

Buining, Paul A., et al., "Effect of Hydrothermal Conditions on the Morphology of Colloidal Boehmite Particles: Implications for Fibril Formation and Monodisperity", *J. Am. Ceram. Soc.*, vol. 73, No. 8, pp. 2385–2390 (1990).

\* cited by examiner

*Primary Examiner*—Tom Dunn

(57) ABSTRACT

An alumina sol, containing a small amount of water of crystallization inside the crystal lattice of boehmite, having high mechanical strength, properties suitable for use as an alumina adsorbent or carrier, and the ability to be formed without additional concentration. The alumina sol comprises a fibrous boehmite having the molecular formula $Al_2O_3 \cdot 1.05–1.30\ H_2O$ with the weight average diameter and the weight average length being respectively in the range of 3 to 50 nm and in the range of 30 to 3000 nm, and has an alumina concentration of 15 to 60% by weight.

8 Claims, 4 Drawing Sheets

Fig. 5 ×42,000

ALUMINA SOL, PROCESS FOR PREPARING THE SAME, PROCESS FOR PREPARING ALUMINA MOLDING USING THE SAME, AND ALUMINA-BASED CATALYST PREPARED THEREBY

This application is the national stage under 35 U.S.C. §371 of Application No. PCT/JP97/00663 filed Mar. 4, 1997, corresponding to Japanese Application No. 078227/1996, filed Mar. 5, 1996.

BACKGROUND OF THE INVENTION

The present invention relates to an alumina sol, a process for producing the same, a process for producing an alumina forming product using the same, and an alumina supported catalyst obtained by the use of the alumina forming product. More particularly, the invention relates to an alumina sol comprising fibrous boehmite of high monodispersibility which contains a small amount of water of crystallization and is composed of thin and long boehmite fibers. The invention also relates to a process capable of producing the alumina sol in a high concentration. The invention further relates to a process for producing an alumina forming product, wherein the above alumina sol is used without subjecting it to a special concentration operation to produce an alumina forming product that is optimum for alumina adsorbent or alumina carrier which has excellent mechanical strength and sharp pore distribution and is useful in fields of catalyst industry, exhaust gas purification and petroleum chemistry. The invention furthermore relates to an alumina supported catalyst which is obtained by supporting an active metallic component on the alumina forming product and thereby shows desired properties, which has excellent mechanical strength and sharp pore distribution, and which is favorable for heavy oil treatment in the petroleum refining.

Processes for producing alumina sols, alumina methods having $\rho$- and $\chi$-crystal structures, hydrolyses of aluminum salts, metal supporting methods, forming methods and hydrogenation catalysts, etc. of the prior art, all relating to the present invention, are described below.

With respect to an aqueous alumina sol obtained by hydrolysis of aluminum alkoxide, Japanese Patent Laid-Open Publication No. 10535/1995 (referred to as "Publication No. 1" hereinafter) discloses a process wherein hydrated alumina is deflocculated under heating in the presence of an acid to produce a transparent low-viscosity alumina sol. With respect to needle-like colloidal boehmite, a process wherein aluminum alkoxide is hydrolyzed to produce boehmite having a length of 100 to 500 nm is disclosed in J. Am. Cera. Soc., 74(6) 1,303–1,307 (1991) (referred to as "Publication No. 2" hereinafter).

With respect to a process for producing an aqueous alumina sol using metallic aluminum, Japanese Patent Laid-Open Publication No. 166220/1985 (referred to as "Publication No. 3" hereinafter) discloses a process wherein an amorphous fibrous alumina sol is produced from metallic aluminum and an organic acid; and Japanese Patent Laid-Open Publication No. 24824/1993 (referred to as "Publication No. 4" hereinafter) discloses a process wherein hydrochloric acid is added in the presence of silicic acid ion and sulfuric acid radical to produce an amorphous alumina sol of bunchy fibers having a diameter of 20 to 100 $\mu$m and a length of 200 to 500 $\mu$m.

As examples of the processes using a starting material analogous to that of the present invention, that is, the processes for producing alumina forming products wherein ultrafine boehmite or bayerite is synthesized from alumina having $\rho$- and $\chi$-crystal structures obtained by the contact of aluminum hydroxide with hot gas and the boehmite or bayerite is used to produce alumina forming product, the following ones can be mentioned. Japanese Patent Publication No. 21319/1975 (referred to as "Publication No. 5" hereinafter) discloses a process for producing an active alumina forming product. Japanese Patent Laid-Open Publication No. 74994/1976 (referred to as "Publication No. 6" hereinafter) discloses a process for producing a forming product carrier for a high-purity, thermally stable, active alumina supported catalyst. Japanese Patent Publication No. 13446/1984 (referred to as "Publication No. 7" hereinafter) discloses a process for producing alumina in the form of flaky or bunchy ultrafine boehmite. Japanese Patent Laid-Open Publication No. 72624/1986 (referred to as "Publication No. 8" hereinafter) discloses a process for producing dispersible hydrated aluminum oxide having a low bulk density.

In the general process for producing an alumina forming product, aluminum salt, aluminate or the like is hydrolyzed to produce an alumina hydrogel in the presence of a salt as a by-product, and the hydrogel is subjected to washing of the salt and concentration to obtain an alumina forming product. In the forming product obtained by the process, the surface area and the pore volume can be made large, but the pore structure and the strength are insufficient. In such circumstances, Japanese Patent Laid-Open Publication No. 26512/1986 (referred to as "Publication No. 9" hereinafter) describes improvement of the pore structure. With respect to industrial forming, Japanese Patent Laid-Open Publications No. 7164/1971 and No. 16395/1972 (referred to as "Publication No. 10" and "Publication No. 11", respectively, hereinafter) disclose a process comprising washing an alumina hydrogel obtained by hydrolysis over a filter to remove a salt as a by-product, subjecting the hydrogel filter cake containing a large amount of water to spray drying in a hot gas to obtain a dry product, pulverizing the product, adjusting the water content and forming. Japanese Patent Laid-Open Publication No. 104568/1994 (referred to as "Publication No. 12" hereinafter) discloses a process comprising washing a hydrogel obtained by hydrolysis, drying the hydrogel, mixing the dry gel in a mixer in the presence of a deflocculating agent, and extruding the mixture.

The hydrogenation catalyst carrier for use in the petroleum refining industry is produced by the hydrolysis method capable of making the pore volume large, but the strength of the resulting catalyst is insufficient. In the petroleum refining industry, the insufficient strength of the catalyst may cause such a serious problem that powdering of the catalyst takes place in the reactor to mainly cause a biased stream, whereby a local abnormal high temperature is brought about.

In the three way catalysts for the automobile exhaust gas purification, catalyst carriers wherein materials mainly made of alumina are supported on honeycombs made of cordierite or stainless steel are employed. The corrugated catalyst carriers having a laminated structure are ideal in other catalytic reactions, but they have not been commercialized yet.

In the process for producing an alumina sol using aluminum alkoxide, that is described in Publication No. 1, an alumina sol is synthesized in an alumina concentration of 5 to 10%, and the alumina sol is concentrated by heating to have a concentration of up to 20%. The fiber form is not described, but from the viscosity formula of the colloidal solution, it is easily presumed that the resulting boehmite particle in the low-viscosity alumina sol is extremely short. The alumina forming product obtained from the particles has a three-dimensional network with narrow voids even when the alumina sol is converted to a hydrogel, and therefore it becomes difficult to ensure a sufficient pore volume. In the process of Publication No. 2, colloidal boehmite in the form of needles of 200 to 500 nm and having a low content of water of crystallization is obtained, but there remain problems such as that plural kinds of aluminum alkoxides are used, the synthesized alumina sol has only a low alumina concentration of not more than 1%, and because of the too low alumina concentration, extensive equipment and a large number of steps are necessary for conducting concentration. Moreover, there is a commercial problem such that the use of the special aluminum alkoxide and the synthesis conditions within the low-concentration region make it impossible to mass produce alumina sols at low costs.

In each of the processes of Publications No. 3 and No. 4 to produce a fibrous alumina sol from metallic aluminum, an alumina sol of amorphous fibrous particles is obtained. In the fibrous alumina sol obtained by the process described in Publication No. 4, the fibers are in the form of bunches. In such alumina sol of bunchy fibers, however, the pore diameter formed in the secondary particles (agglomerates) is small, and macropores are produced as voids among the secondary particles (agglomerates). Thus, the whole pore distribution becomes such a broad pore distribution that various pores from micropores to macropores are present, so that any favorable pore structure cannot be expected. The alumina concentrations in the examples are 10 to 11 %, and therefore if a high concentration is desired, great concentration equipment is necessary.

The process for producing an alumina forming product, wherein starting alumina having $\rho$- and $\chi$-crystal structures is used and the crystal form is transformed to a desired crystal form, has more simple steps as compared with the hydrolysis method. However, the alumina forming products obtained in Publications No. 5 and No. 6 have a small pore volume and are insufficient in physical properties required for various uses such as catalysts. Further, it is not described in the publications that an alumina forming product having a sharp pore distribution was produced.

Publication No. 7 relates to a process for producing an aqueous suspension of alumina in the form of ultrafine boehmite by treating alumina obtained by rapid heating dehydration of aluminum hydroxide with a monobasic acid and another chemical agent. In this process, synthesis is carried out with stirring under the conditions of an anionic ion/alumina molar ratio of not more than 6 and a temperature of 120 to 225° C. in the presence of an acid and a salt each having a pH value of not more than 9. As can be seen from the description in the specification and FIGS. 2 to 5, an aqueous suspension of ultrafine boehmite in the form of flakes or bunches is obtained in this process. In spite of the sol state, the ultrafine boehmite in the form of flakes or bunches has a large particle diameter and is precipitable. Moreover, it has great resistance to filtration and a low light transmittance, and is opaque or cloudy. When an alumina forming product is produced from the flaky boehmite, the forming product has a defect of a small pore volume of pores having a preferred pore diameter. On the other hand, the bunchy boehmite produces a forming product having a broad pore distribution wherein various pores from micropores to macropores are present and showing low strength because of presence of the macropores, similarly to the bunchy alumina sol described in the aforesaid Publication No. 4. Thus, conditions for synthesizing boehmite suitable for alumina adsorbent, alumina carrier or hydrogenation catalyst are not fixed in Publication No. 7. Publication No. 8 has such a problem that starting alumina having a mean particle diameter of 0.4 to 0.6 $\mu$m is necessary and adjustment of the starting material needs extensive equipment.

The alumina forming products obtained by hydrolysis of aluminum salts or aluminates are widely used, for example, as hydrogenation catalysts for petroleum refining, but they have the following qualitative and productive problems.

An important qualitative problem of the hydrogenation catalysts produced by hydrolysis of aluminum salts is low strength. In order to precipitate aluminum hydroxide by neutralization reaction of an acid and alkali, the reaction must be carried out at a higher rate than the rate at which the boehmite crystal lattice is arranged in order and which is inherent in boehmite. Under such conditions, however, obtainable are only (1) disordered crystal lattice containing a large amount of water of crystallization, (2) short fibers and (3) secondary particles (agglomerates) in which fibers of primary particles are agglomerated. These basic particles have low strength, and drying shrinkage of the forming product is large owing to the particle form of the boehmite. As a result, fine cracks are produced in the drying stage, whereby the strength is lowered. Basically, the conditions of pH value and the temperature in the neutralization reaction in the hydrolysis method are those for the precipitation of gibbsite or bayerite. Therefore, under the reaction conditions suitable for a slow growth rate that is necessary for arranging the boehmite crystal lattice in order, gibbsite or bayerite is produced. That is, satisfactory reaction time conditions matching with the crystal growth rate inherent in the boehmite crystal cannot be determined.

For the above reasons, the aluminum salt hydrolysis method has such a problem that monodispersible boehmite comprising long fibers and having orderly crystal lattice cannot be obtained.

The hydrolysis method has other problems about its process, for example, problems of high costs and environment accompanied by washing of a salt as a by-product and problems of oversized equipment and plural stages accompanied by synthesis of a dilute product. As described in Publications No. 10 and No. 11, the process to obtain a forming product of boehmite produced by hydrolysis of aluminum salt comprises a step of preparing an aluminum salt aqueous solution, a step of hydrolysis by neutralization and a step of removing a salt as a by-product by washing with ion-exchange water, and further comprises additional plural steps of spray drying, pulverization, sieving and water content adjustment, prior to the extruding step, because the washed filter cake has a low alumina concentration. Thus, the process is very complicated and lacks productivity.

To improve insufficient strength of the hydrogenation catalysts, a method of using an alumina sol obtained by the aforesaid aluminum alkoxide method or metallic aluminum method has been hitherto proposed as a substitution of the aluminum salt hydrolysis method. In the method, however, it is impossible to form a suitable pore structure, or if possible, there reside other problems of cost and quality. Also in the case of alumina obtained by the use of an alumina starting material having $\rho$- and $\chi$-crystal structures, that is described in the above publications, it is impossible to form a suitable pore structure, or if possible, there reside other qualitative problems.

It is necessary to obtain boehmite primary particles which are so designed that they are capable of providing alumina adsorbent, alumina carrier or hydrogenation catalysts showing high strength with keeping a preferred pore volume and a sharp pore distribution, and to establish a process for synthesizing them.

It is known that the pore distribution of the catalyst carrier has close relation to catalytic activity, selectivity and life. Particularly in case of a hydrogenation catalyst for heavy oil, blocking of pores caused by diffusion of asphaltene in the heavy oil into pores causes deactivation of the catalyst. Therefore, there is desired a catalyst having a macropore-free pore structure, a moderately large pore volume, a small number of micropores for the purpose of decreasing decomposition activity, and a moderate specific surface area for the purpose of maintaining high activity and high mechanical strength. This proposes a basic subject of alumina material for constituting alumina adsorbent, alumina carrier or hydrogenation catalyst.

In order to allow an alumina carrier to have a large specific surface area, the alumina carrier should be made from boehmite having a small particle diameter, because the specific surface area depends on the outside surface area of the basic particles. It is a premise of a large pore volume that the alumina carrier is composed of a fibrous (or needle-like) material having a three-dimensional network. In order to allow an alumina carrier to have a sharp pore distribution, it is essential that the alumina carrier is constituted of primary particles monodispersed. Secondary particles (agglomerates) are unfavorable, because micropores are produced in the agglomerates and macropores are produced between the agglomerates. For obtaining an alumina forming product having high mechanical strength, it is desired that the inside structure of the crystal lattice of the primary particles is in order. For preventing cracks, it is desired that fibers having moderate thickness and length are monodispersed. Further, it is desired that production of macropores between the secondary particles (agglomerates) is minimized, because the macropores exert great influences on the mechanical strength.

SUMMARY OF THE INVENTION

In the present invention, alumina of $\rho$- and $\chi$-crystal structures obtained by rapid heating dehydration of aluminum hydroxide is used singly or in combination with alumina having higher solubility than boehmite as the alumina source, whereby synthesis of an alumina sol comprising the boehmite fibers having the aforesaid subject can be accomplished. The synthesis conditions are obtained only by optimization of a mixing ratio between alumina materials, alumina particle size, type of acid, alumina concentration, amount of acid added, heating temperature and heating time in the hydrothermal reaction, stirring in the reaction vessel, heating operation of the reaction vessel, etc.

As the alumina having higher solubility than boehmite, useful is alumina at least partially comprising gibbsite, bayerite, nordstrandite, amorphous hydrated alumina, amorphous alumina, a commercially available calcined alumina such as $\chi$-alumina, which is calcined by low temperature, $\gamma$-alumina or $\eta$-alumina.

To examine properties of the synthesized alumina sol, the alumina sol was subjected to measurements of viscosity, amount of precipitate, filtration property using filter paper and light transmittance, X-ray diffraction and observation by an electron microscope. The alumina sol was formed into an alumina forming product, and the forming product was subjected to measurements of BET specific surface area, pore volume of pores having a pore diameter of less than 60 nm, pore distribution, macropore volume and compressive crushing strength.

As a result, it has been found that the amount of precipitate, the filtration property, the light transmittance and the electron microscope observation have a conspicuous correlation to the pore distribution and the macropore volume. That is, the alumina sol having a small amount of precipitate, good filtration property and a high light transmittance contains thin boehmite fibers, is highly monodisperse, and gives a small macropore volume and a sharp pore distribution. On the other hand, in the alumina sol having a large amount of precipitate, poor filtration property and a low light transmittance, presence of boehmite particles in the form of flakes, plates, bunches or other agglomerates has been confirmed. A forming product obtained from this alumina sol has macropores and shows a broad pore distribution. Therefore, a pore structure of the alumina forming product can be estimated from the results of measurements of the amount of precipitate, the filtration property and the light transmittance. In particular, presence or absence of the particles of several tens nm can be seen from the light transmittance, and thereby correlation to a sharp pore distribution can be obtained.

The viscosity of the alumina sol has a close relation to the viscosity formula given by the fiber length of the boehmite fibers observed by an electron microscope. An alumina sol comprising boehmite having a long fiber length shows a high viscosity, and from this alumina sol, alumina of a large pore volume can be obtained. An alumina sol comprising boehmite having a short fiber length shows a low viscosity, and from this alumina sol, alumina of a small pore volume can be obtained.

The alumina forming product using a cloudy alumina sol having a low light transmittance tends to have a large macropore volume and markedly low compressive crushing strength.

The alumina sol for constituting preferred alumina adsorbent, alumina carrier and hydrogenation catalyst is basically an alumina sol wherein boehmite fibers are monodispersed, the fiber length is moderately long, and no particles in the form of flake, plate, bunch or other agglomerates are contained. Such alumina sol exhibits a moderate viscosity and a high light transmittance.

The process for producing the alumina sol and the process for producing an alumina adsorbent, an alumina carrier and a hydrogenation catalyst using the alumina sol are described below.

A weakly acidic chemical reagent was added to an alumina source to conduct reaction at a temperature of not higher than 100° C. at atmospheric pressure, and then hydrothermal treatment was carried out at a temperature of not lower than 100° C. under pressure.

The chemical reagent was selected from various acids and salts, and useful examples thereof include inorganic monobasic acids, such as hydrogen halide acids (e.g., hydrofluoric acid, hydrochloric acid, bromic acid, iodic acid) and nitric acid; lower aliphatic monocarboxylic acids, such as formic acid, acetic acid and propionic acid; aluminum salts of these acids; and poly(aluminum salts), such as poly(aluminum chloride). These chemical reagents may be used singly or in combination.

In contrast, sulfuric acid, phosphoric acid, oxalic acid, benzoic acid, phenol, phenoxyacetic acid, maleic acid, phthalic acid, citric acid, glycolic acid, malic acid, crotonic acid, sorbic acid, aluminum sulfate, phosphoric acid, ammonium nitrate and the like cannot produce any aqueous alumina sol even if they are added in any variation of the level of addition, and they produce a precipitable cloudy material. The cloudy precipitated suspended material is a gel-like precipitate, a bulky agglomerate or a heavy precipitate, and each of them has a boehmite structure.

If the amount of the acid or the aluminum salt added as the chemical reagent is small, boehmite in the form of flake or plate is obtained. If the amount thereof is large, boehmite of fine agglomerated particle is obtained. In each case, the light transmittance is low and the pore distribution of the resulting alumina forming product is unfavorable. The preferred amount of the acid will be described later in detail, because the amount of the acid relates to the alumina concentration.

The apparatus and the operation to synthesize an alumina sol by hydrothermal treatment are described below. There was found a conspicuous difference in the properties of the synthesized alumina sol between the case where stirring was continued after the temperature was raised and the case where stirring was terminated. The alumina sol obtained by continuation of stirring had a markedly low light transmittance, and from the electron microscope observation, the boehmite fibers were found to be in the form of bunchy agglomerates. Further, increase of macropores was observed in the alumina forming product. The alumina sol obtained by terminating stirring after the temperature rise had a high light transmittance, and from the electron microscope observation, the boehmite fibers were found to be monodispersed. The bunchy boehmite disclosed in Publication No. 7 seems to have been produced due to the synthesis conditions such as stirring.

In the use of a reactor with a local heating system, cloudy hydrated alumina was produced and attached onto the wall of the reactor. In the use of a reactor externally heated by a temperature-controlled air, the reaction product was homogeneous, and an alumina sol having a high light transmittance was obtained. Another external heating method using steam in place of air also gave satisfactory results.

In the hydrothermal treatment, a reaction temperature of lower than 90° C. is unfavorable, because the reaction needs a long period of time, and thereby productivity is lowered. A reaction temperature of higher than 150° C. is also unfavorable, because the viscosity is increased during the temperature rise under the conditions of high concentration to form nonuniform temperature distribution, and the production of a homogeneous alumina sol is inhibited. Besides, the light transmittance is lowered, the diameter of the boehmite fibers becomes large, and the pore volume becomes small.

Described below are results of synthesis of boehmite fibers which are obtained by the present invention and are suitable for alumina absorbent or catalyst preferable for solving the problems of the prior art.

The alumina sol obtained by the present invention is boehmite represented by the molecular formula $Al_2O_3 \cdot 1.05-1.30H_2O$. The value for the water of crystallization of the ideal crystal is 1.0, and the value of the excess $H_2O$ approximates the calculated value of OH group determined from the surface area of the boehmite fibers. Therefore, it is suggested that the amount of excess $H_2O$ inside the crystals is small. The amount of the water of crystallization of boehmite obtained by hydrolysis method is larger by far, and it is apparent that the boehmite of the invention has a crystal structure arranged in better order than boehmite obtained by hydrolysis method. This can be seen also from the X-ray diffraction pattern.

As the value for the water of crystallization in $Al_2O_3$ becomes smaller than 1.05, the form of boehmite is changed from fiber to plate thereby to make the particle diameter larger. Besides, the light transmittance is lowered and a heavy precipitate is apt to be present. As a result, the alumina forming product has a small specific surface area, an extremely small pore volume of pores having necessary diameter, a large macropore volume, a broad pore distribution and low compressive crushing strength. Therefore, such value is unfavorable.

As the value for the water of crystallization in $Al_2O_3$ becomes larger than 1.30, the boehmite tends to be composed of agglomerates of fine fibers. Besides, the light transmittance is lowered and a light precipitate is apt to be present. As a result, the alumina forming product has an extremely small pore volume of pores having necessary diameter, a large macropore volume, a broad pore distribution and low compressive crushing strength. Therefore, such value is unfavorable.

In the fibrous boehmite, the weight mean diameter and the weight mean fiber length are in the ranges of 3 to 50 nm and 500 to 10,000 nm, respectively, as described herein, and such ultralong fibers can be produced by slow synthesis at a low temperature.

As the fiber length becomes longer, the viscosity is increased, and the pore volume of the resulting alumina forming product is increased. A monodisperse sol of fibers having the above diameter and length can easily form a three-dimensional network, and the strength of the three-dimensional network is so high that the impact is scattered. Therefore, the fibrous boehmite has a function of preventing the occurrence of cracking, can be processed onto a ceramic paper and has a possibility of producing a corrugated forming product having a preferred pore structure which consists of only alumina.

The sol of boehmite obtained by the present invention, i.e., a sol of fibrous boehmite having a weight mean diameter of 3 to 50 nm, a weight mean fiber length of 30 to 3,000 nm and an alumina concentration of 15 to 60% by weight, forms a pore structure suitable for a catalyst such as a hydrogenation catalyst and is suitable for producing a catalyst of high strength and small size. The fibers of the above ranges can be synthesized at a temperature of not lower than 110° C. Under the conditions of high temperature and high concentration, thick and short fibers are synthesized. Under the conditions of low temperature and low concentration, thin and long fibers are synthesized.

The invention relates to a process and reaction conditions to produce the above-mentioned both boehmite. The sol of the fibrous boehmite having a weight mean diameter of 3 to 50 nm and a weight mean fiber length of 30 to 10,000 has properties of being converted to a hydrogel which forms a three-dimensional network. By the addition of alkali such as ammonia to keep pH at 4 to 12, the aqueous sol of boehmite forms a three-dimensional network having shrinkage resistance when it is dried, whereby alumina absorbent or alumina carrier having a large pore volume can be obtained.

An important characteristic of the present invention is that the alumina sol can be synthesized in a high aluminum concentration. The viscosity of the reactant is low at first, but the viscosity is increased after the reaction is initiated, and finally stirring becomes difficult or impossible. Specifically, in the operation of temperature rising at the beginning of the synthesis viscosity is increased, and in case of a high concentration of not less than 15%, precipitation of the starting alumina is restrained by the viscosity increase.

Therefore, the stirring can be stopped in the early stage. On the other hand, in case of a low concentration of less than 15%, the viscosity increase needs a long period of time, and stirring needs a long period of time to restrain precipitation of the starting alumina. As a result, the type of reactor and the stirring operation are strictly limited. Further, an evil of the stirring for a long period of time is that bunchy agglomerates of boehmite are produced to cause lowering of quality.

Under the conditions of a high alumina concentration of not less than 60%, a mixture of the starting materials lacks flowability, and it becomes difficult to perform uniform mixing in the mixing step or to perform necessary stirring in the step of temperature rise. Besides the reaction product is a cloudy agglomerate which is not dispersed in water. That is, no alumina sol is produced. Therefore, such high concentration is unfavorable.

In order to maintain a uniform temperature without stirring, hydrothermal reaction is carried out using a special reactor, whereby a high-concentration alumina sol can be synthesized. Consequently, the alumina sol can be directly fed to the forming step without any special operation for adjusting the concentration. Therefore, an extrusion forming product can be produced through a simple process. Further, since a plastic material comprising a high-concentration alumina sol can be obtained, the problems of the conventional forming products of honeycomb structure, such as moldability, cracks by shrinkage in the step of drying, strength and pore structure, can be solved.

The reaction mechanism of producing an alumina sol from starting alumina is as follows. An acid region to extend the a axis of boehmite crystal is selected; starting alumina having higher solubility than boehmite is selected; and the starting alumina is subjected to hydrothermal treatment to increase solubility and dissolution rate, whereby formation of boehmite nucleus and growth thereof are conducted. Various tests are carried out to determine chemical materials capable of synthesizing the alumina sol and to determine the level of addition. Though alumina sols or cloudy suspensions are obtained by the use of various acids and salts, useful ones are selected therefrom. As a result, there are selected inorganic monobasic acids, such as hydrogen halide acids (e.g., hydrofluoric acid, hydrochloric acid, bromic acid, iodic acid) and nitric acid; lower aliphatic monocarboxylic acids, such as formic acid, acetic acid and propionic acid; aluminum salts of these acids; and poly(aluminum salts), such as poly(aluminum chloride).

The chemical reagents useful for converting the starting alumina to an alumina sol are inorganic monobasic acids, lower aliphatic monocarboxylic acids and aluminum salts thereof. From among them, useful acids and alumina salts were specifically selected, and proper ratios thereof to the alumina were determined. As a result, it has been found that the proper addition level varies under the conditions of different alumina concentrations and that the proper value is a variable of the alumina concentration and the acid type, independent of the particle size of alumina exhibiting ρ- and χ-crystal structures, mixing ratio between the alumina exhibiting ρ- and χ-crystal structures and alumina having a higher solubility than boehmite, and heating temperature and time of the hydrothermal treatment.

An experimental formula to calculate the amount of an acid for obtaining a preferred alumina sol was sought, though the amount of the acid stepwise varied correspondingly to various concentrations. As a result, when the molar ratio between starting alumina, an acid and water is represented by the formula aAl2O3.bHA.cH2O described herein satisfy the following relation:

$$k=(b/a)\cdot(b/c).$$

In case of inorganic monobasic acids such as hydrofluoric acid, hydrochloric acid, bromic acid, iodic acid and nitric acid and acids formed by dissociation of their aluminum salts, it is necessary to adjust the starting materials so that a mixture thereof has a k value of 0.0001 to 0.01, preferably 0.0005 to 0.005.

In case of lower aliphatic monocarboxylic acids such as formic acid, acetic acid and propionic acid and acids formed by dissociation of their aluminum salts, it is necessary to adjust the starting materials so that a mixture thereof has a k value of 0.002 to 0.2, preferably 0.005 to 0.05.

By setting the k value high or low, alumina sols having different properties can be obtained. The pore structure of an alumina forming product obtained from the alumina sol can be controlled, that is, the pore volume of pores having a pore diameter of less than 60 nm and the macropore volume of pores having a pore diameter of not less than 60 nm can be controlled, whereby there can be obtained an alumina forming product having a sharp pore distribution, an alumina forming product having a broad pore distribution and an alumina forming product of bimodal type having two peaks of distribution in a micropore region and a macropore region.

The alumina adsorbent obtained from an alumina sol having a high light transmittance has a large specific surface area, a large pore volume of pores having a pore diameter of less than 60 nm and a sharp pore distribution. The pore distribution is varied by various factors other than the k value, such as mixing ratio of the starting alumina materials, alumina concentration, temperature of hydrothermal treatment and type of an acid, and preparation conditions to change values of the micropore volume of pores having a pore diameter of less than 60 nm, mean pore diameter, sharpness of pore distribution and bimodal type can be obtained. Therefore, different needs for various pore structures of the hydrogenation catalysts used in the petroleum refining industry can be satisfied.

As a result of studies on various starting alumina materials, aluminum trihydrate crystals such as gibbsite, bayerite, nordstrandite are employable as the alumina sources in the process of the invention. These aluminum trihydrates are obtained by vacuum heating dehydration or high-temperature rapid dehydration, and they are each alumina generally having a specific surface area of 200 to 400 m²/g, partially having rehydration properties and exhibiting ρ- and χ-crystal structures. The other starting alumina to be mixed with the above alumina is one having higher solubility in water than the boehmite produced. Specifically, there can be employed alumina at least partially comprising gibbsite, bayerite, nordstrandite, amorphous hydrated alumina, amorphous alumina or commercially available calcined χ-alumina such as χ-alumina, γ-alumina or η-alumina.

Though alumina forming products or alumina carriers having a large pore volume have been hitherto provided only by hydrolysis of aluminum compound, the present invention can provide a simple process wherein such products can be produced at low costs and with a small amount of wash drain, by the use of alumina exhibiting ρ- and χ-crystal structures, gibbsite (and/or calcined χ-alumina) and a small amount of an acid as main starting materials.

The process for producing an alumina sol described herein relates to an apparatus and an operation of the hydrothermal reaction. In this process, either stirring accompanied by substantial slight shearing, no stirring or a combination thereof is performed throughout the process except during the period of heating up and the initial period of reaction. Examples of the reactors and the stirring apparatuses effectively used include a reactor equipped with a paddle stirrer, a rotary type reactor, a shaking type reactor, circulation of reactants, a bubble stirring type reactor and stirring with steam blowing. The heating temperature is maintained by the use of a temperature-controlled heating medium set apart from the reactants by a reactor wall. Examples of the heating media include air, warm or hot water, steam and an organic heating medium. By the adoption of such heating system, qualitative effects such as high monodispersibility are exerted and high-concentration synthesis can be performed.

The alumina sol comprising the fibrous boehmite is heated at a temperature of 70 to 250° C. to concentrate or dry it, whereby solid xerogel boehmite having such properties that it is partially or almost wholly redispersed reversibly in water or in a polar organic compound can be easily produced. The typical thermal behavior of the aqueous sol boehmite is that a part of an acid and water in the mother liquor first evaporate under heating and the aqueous sol completely becomes solid when the alumina concentration is not less than 60 %. At 110° C., the alumina concentration is 80%; at 250° C., the adsorbed acid and water slowly evaporate and the alumina concentration becomes 82%; and within the temperature range up to 450° C., dehydration of water of crystallization takes place to transform the crystal to $\gamma$-alumina.

The solid xerogel boehmite obtained by drying at a low temperature is redispersed in water or a polar organic material and reversibly returns to an aqueous alumina sol. However, with increase of the drying temperature, the xerogel boehmite hardly returns to the alumina sol.

In the sol obtained by redispersing the thus dried solid xerogel boehmite, the amount of the acid during the reaction is not always optimum for stabilization of the sol, and therefore drying of the sol to remove the excess acid is preferably carried out from the viewpoints of stabilization and viscosity.

The alumina sol obtained by the process described herein, or xerogel alumina obtained from any of the alumina sols is formed into an alumina forming product, particularly an alumina absorbent, an alumina carrier or a catalyst, in the form of micro sphere, bead, cylinder, modified cross-section bar, pipe, sheet, wavy sheet, honeycomb or corrugated sheet, and the forming product is subjected to heat treatment.

The alumina sol suitable for the catalysts can be synthesized by varying the molar ratio between the acid, alumina and water. In order to produce an alumina carrier for catalyst, for which presence of macropores is unfavorable, the k value is in the range of about 0.001 to 0.02 provided that nitric acid is used as the acid, and it is in the range of about 0.01 to 0.02 provided that acetic acid is used as the acid. In order to produce a bimodal type alumina carrier for catalyst, the k value is changed depending on the necessary pore volume of macropores. In this case, the k value is preferably 0.0005 or 0.005 provided that nitric acid is used as the acid, and it is preferably 0.005 or 0.05 provided that acetic acid is used as the acid.

The alumina sol of the invention is highly monodisperse and has fibrous properties. Accordingly it has excellent moldability such as a low extrusion pressure, plasticity, green strength and no cracks caused by shrinkage in the drying. It is thought that the strength of the forming product is remarkably improved by virtue of the synergetic effect of the excellent moldability and the basic strength of the boehmite crystal lattice free from excess $H_2O$ inside the crystal. Further, it is thought that the fact that the plastic material to be extrusion formed can be directly used without varying its alumina concentration contributes to stability of the strength of the forming product and to productivity thereof. A part of or all of the reversibly water-redispersible alumina can be redispersed in water and then formed.

To form a three-dimensional network, there are three methods conducted before or after the forming process. In the first method, the sol is made neutral or weakly basic by an alkali material such as ammonia water and thereby converted to a hydrogel having a three-dimensional network, followed by forming the hydrogel. The forming of the hydrogel is similar to that in the hydrolysis process.

In the second method, the weakly acidic reaction product taken out of the reactor is directly fed to an extruder, and the fibrous boehmite in the monodispersed state is orientated lengthwise by a forming die, followed by forming.

In the third method, the forming product whose fibrous boehmite is orientated, that is obtained by the second method, is contacted with an alkali material such as ammonia gas to make it neutral or weakly basic and thereby converted to a hydrogel having a three-dimensional network of different structure.

The alumina forming product obtained by each of the second and third methods had high mechanical strength. In particular, the alumina forming product obtained by the third method had a large pore volume, similar to the alumina forming product obtained by the first method. In the third method, the weakly acidic reaction product showing plasticity even in a high concentration is formed and then contacted with ammonia gas or the like to convert it to a hydrogel having a three-dimensional network, so that shrinkage caused by drying can be reduced. Accordingly, this method is favorable for producing an elaborate and large forming product.

The alumina supported catalyst comprising the above-mentioned alumina forming product has a preferred pore volume and high mechanical strength, and is particularly preferable as a hydrogenation catalyst. The hydrogenation catalyst is obtained by forming the alumina sol obtained by the present invention by the third method, drying and calcining the forming product, then washing it to remove a slight amount of alkali, and allowing it to support thereon a metal atom of Group 5A, Group 6A or Group 8 of the periodic table. This hydrogenation catalyst has a sufficiently large pore volume and a high mechanical crushing strength. The mean pore diameter of the alumina of the invention can be varied in a wide range of 8 to 25 nm, with keeping a sharp pore distribution. In various hydrogenation catalysts, various phenomena such as diffusion of asphaltene into the catalysts, blocking of pores caused by deposition of nickel or vanadium, and production of carbon caused by overdecomposition of heavy hydrocarbon depend on their pore diameters. Therefore, the demetalization catalyst in the former stage and the desulfurization catalyst or the denitrification catalyst in the latter stage require the catalyst to have different pore distributions. By the use of various alumina sols of the present invention, catalysts having various pore distributions are available. The alumina supported catalyst of the invention is favorably used as a carrier for a reforming catalyst or a coal type hydrocarbon hydrogenation catalyst.

Since a hydrogenation catalyst having high mechanical crushing strength and a favorable pore structure can be obtained, the problem of the occurrence of channeling in the reactors for hydrogenation can be solved, and thereby improvement of the reaction activity and prolongation of the running time can be expected.

DETAILED DESCRIPTION OF THE INVENTION

Figure 1:
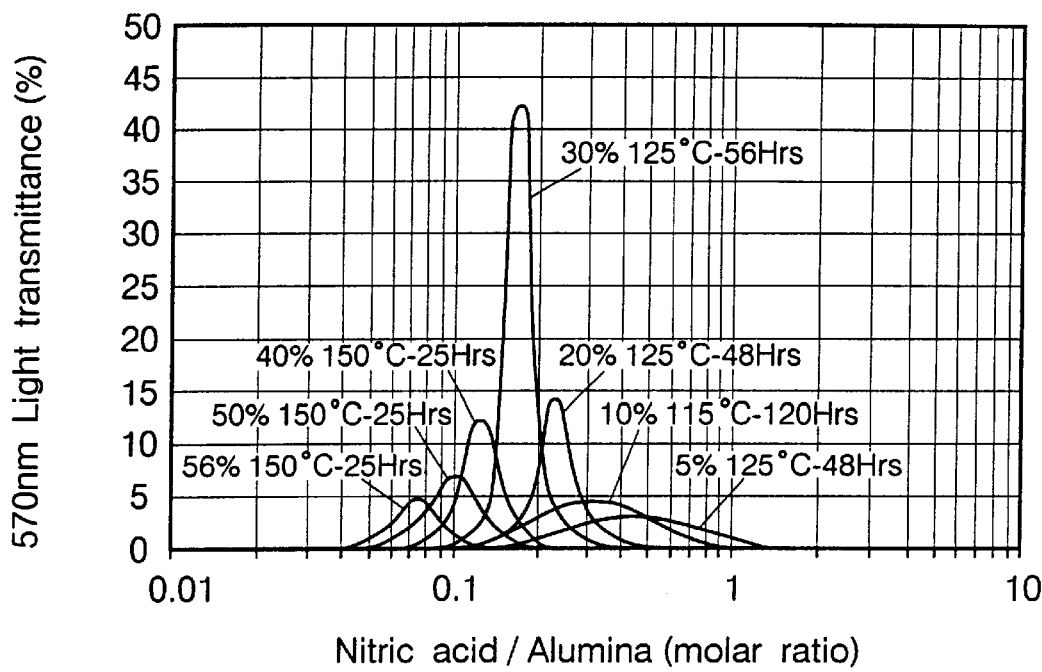
FIG. 1 shows an amount of nitric acid added and a light transmittance of the resulting sol.

Alumina obtained by rapid dehydration of aluminum hydroxide and having rehydration properties and $\rho$- and $\chi$-crystal structures was mixed with gibbsite and/or alumina obtained by calcining gibbsite at a temperature of several hundreds degrees centigrade (generally called "calcined alumina") in an amount of 0 to 95% in terms of oxide. To the mixture was added a monobasic acid or its aluminum salt in a slight amount (several percents to several tens percents of 1 mol of the starting alumina), and the resulting mixture was subjected to hydrothermal treatment in the presence of water to convert the mixture to an alumina sol. The alumina used above had a mean particle diameter of point several $\mu$m to several tens $\mu$m. In the alumina, a slight amount of $Na_2O$ was contained, so that washing of the forming product in the later stage was useful.

The crystal form of the obtained fibrous boehmite was examined by X-ray diffractometry. The amount of water of crystallization was determined from the constant weight of a dry product obtained by drying at 110° C. after washing for neutralization and the ignition loss at 1,000° C.

When the k value is small, the molecular formula becomes $Al_2O_3.1.05–1.10H_2O$. When the k value is large, the molecular formula becomes $Al_2O_3.1.20–1.30H_2O$. The fibrous boehmite with a preferred k value had a molecular formula $Al_2O_3.1.10–1.20H_2O$. The amount of water of crystallization had a close correlation to the k value, but the type of an acid, the alumina concentration and the temperature or the time of the hydrothermal treatment hardly influenced the k value. The measured value of the water of crystallization of the obtained fibrous boehmite was almost identical with a value obtained by adding a theoretical value 1.0 of the complete crystal to the number of OH groups on the fiber surfaces calculated based on the area of each crystal face.

The particle diameter of the fibrous boehmite was determined by the electron microscope observation and the specific surface area, and the fiber length was determined by the limiting viscosity and the electron microscope observation. The factors to control the weight mean diameter and the weight mean fiber length of the boehmite fibers to be 3 to 30 $\mu$m and 30 to 10,000 $\mu$m, respectively, were as follows. In the low-temperature reaction, the diameter becomes small and the fiber length becomes long. In the high-temperature reaction, the diameter becomes large and the fiber length becomes short. As for the influences of the alumina concentration, if the alumina concentration was low, the fiber length becomes long. If the alumina concentration was high, the fiber length becomes short. As for the mixing ratio between the alumina exhibiting $\rho$- and $\chi$-crystal structures, gibbsite and the calcined alumina, if the amount of the alumina exhibiting $\rho$- and $\chi$-crystal structures is large, the diameter becomes small and the fiber length becomes long. If the amount of the alumina exhibiting $\rho$- and $\chi$-crystal structures is small, the diameter becomes large and the fiber length becomes short. The electron microscope observation resulted in that the fibrous boehmite particles show high monodispersibility.

As for the apparatus and the operation to synthesize the alumina sol by hydrothermal treatment, it was necessary to restrain precipitation of the starting alumina powder in the early step of the reaction and to perform stirring for the purpose of uniform temperature rise. A reactor equipped with a paddle agitator and a rotary type reactor were used. The viscosity of the reactant was low at first, then increased during the temperature rise, and became high in the early step of the reaction after the temperature rise. When the concentration was high, use of the paddle agitator was entirely impossible, and the stirring was stopped. Without stirring, the temperature of the system was uniformly maintained by a temperature-controlled heating medium such as air, steam or warm water through the reactor wall. In case of the reaction product locally having temperature difference in the reactor, a preferred alumina sol was not obtained, because migration of volatile components took place in the reaction product.

Under the conditions of a low concentration of 10%, continuous stirring was able to be conducted. The alumina sol obtained with stirring was compared with the alumina sol obtained without stirring. As a result, the aqueous sol boehmite fibers obtained by continuously stirring for a long period of time were cloudy and had a low light transmittance. Moreover, bunchy agglomerates of fibers were observed by the electron microscope. Therefore, in the production of monodispersed fibrous boehmite that is an object of the invention, continuous stirring provided unfavorable quality.

Figure 2:
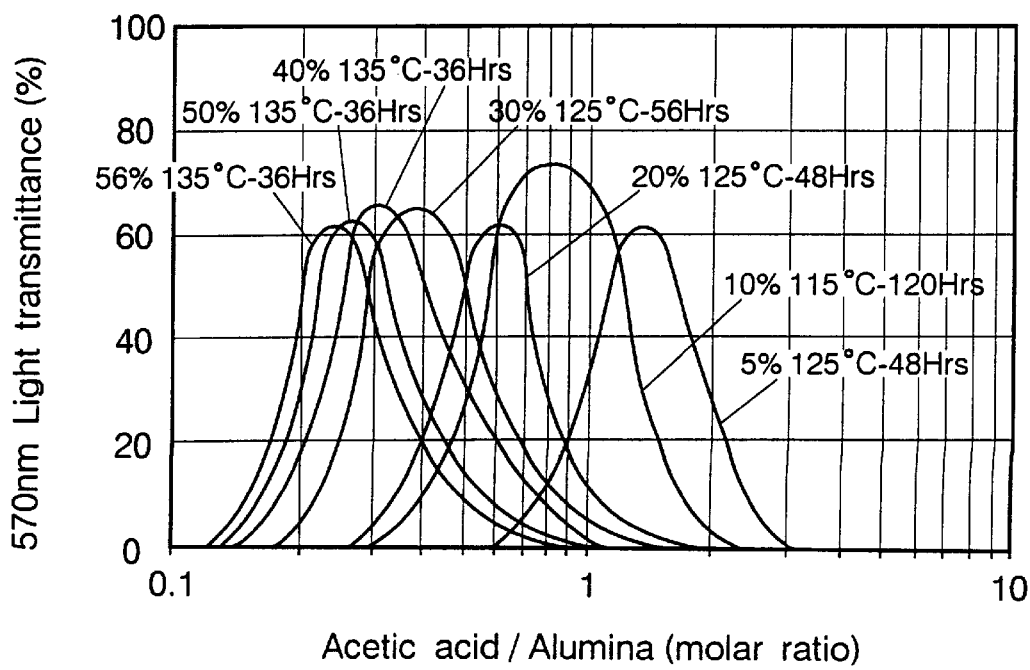
FIG. 2 shows an amount of acetic acid added and a light transmittance of the resulting sol.
Figure 3:
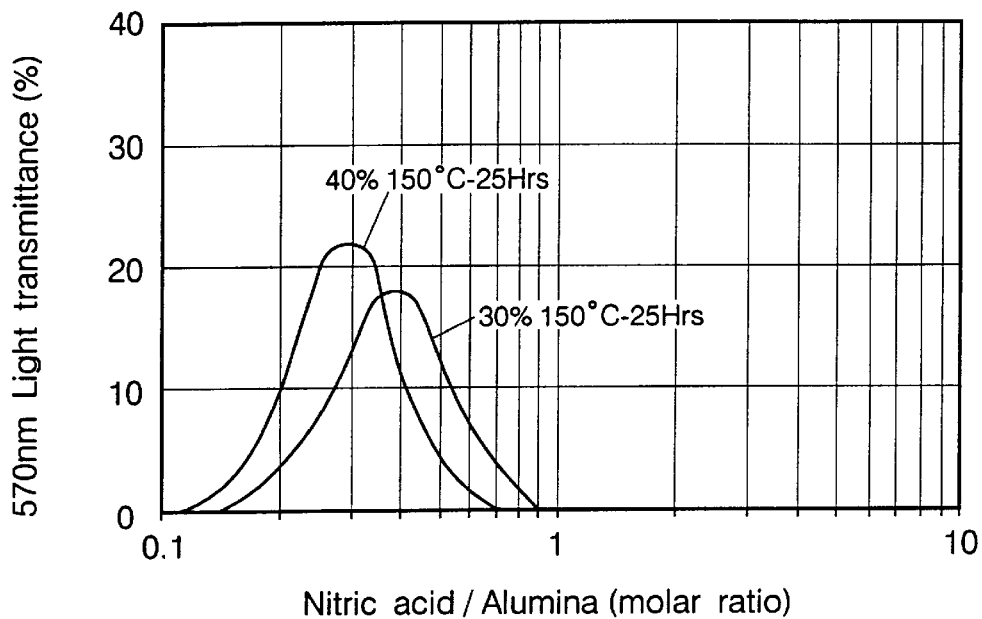
FIG. 3 shows an amount of acetic acid added and a light transmittance of the resulting sol in the case where mixed alumina is used.

FIGS. 1 to 3 show results of measurements of light transmittance in the case where nitric acid or acetic acid was used and the additional ratio of the acid to the alumina was varied. FIG. 1 shows results of the measurement in the case where 100% of alumina exhibiting $\rho$- and $\chi$-crystal structures and nitric acid were used. In FIG. 1, the number of moles of the nitric acid based on 1 mol of the alumina is plotted as abscissa and the light transmittance at a visible light of 570 nm as ordinate. The synthesis reaction was carried out in alumina concentrations of 5%, 10%, 20%, 30%, 40%, 50% and 56% and at a different hydrothermal treatment temperature of from 115° C. to 150° C. The fibrous boehmite having a high light transmittance had a small diameter and high monodispersibility. The boehmite having a low light transmittance on the right side of each curve had agglomerates of fibers. The boehmite having a low light transmittance on the left side of each curve was in the form of flake or plate and had a large diameter. In order to obtain preferred fibrous boehmite, the amount of nitric acid was large when the alumina concentration was low, and the amount thereof was small when the alumina concentration was high.

FIG. 2 shows results of the synthesis reaction wherein acetic acid was used, the alumina concentration was varied in the range of 5% to 56% similarly to FIG. 1, and the hydrothermal treatment temperature was varied in the range of 115° C. to 135° C. Similarly to the case of using the nitric acid, in order to obtain an alumina sol having a high light transmittance, the amount of acetic acid was large when the alumina concentration was low, and the amount thereof was small when the alumina concentration was high. However, the number of moles of the acetic acid based on 1 mol of the alumina was larger than that of the nitric acid.

FIG. 3 shows light transmittance of fibrous boehmite obtained by the synthesis reaction wherein alumina exhibiting ρ- and χ-crystal structures and gibbsite were mixed in equimolar amounts, the alumina concentration was 30% or 40%, and the hydrothermal treatment temperature was 150° C. The number of moles of the acetic acid based on 1 mol of the alumina to obtain an aqueous alumina sol of a high light transmittance was the same as that in the case of an alumina concentration of 30% or 40% in FIG. 2.

Figure 4:
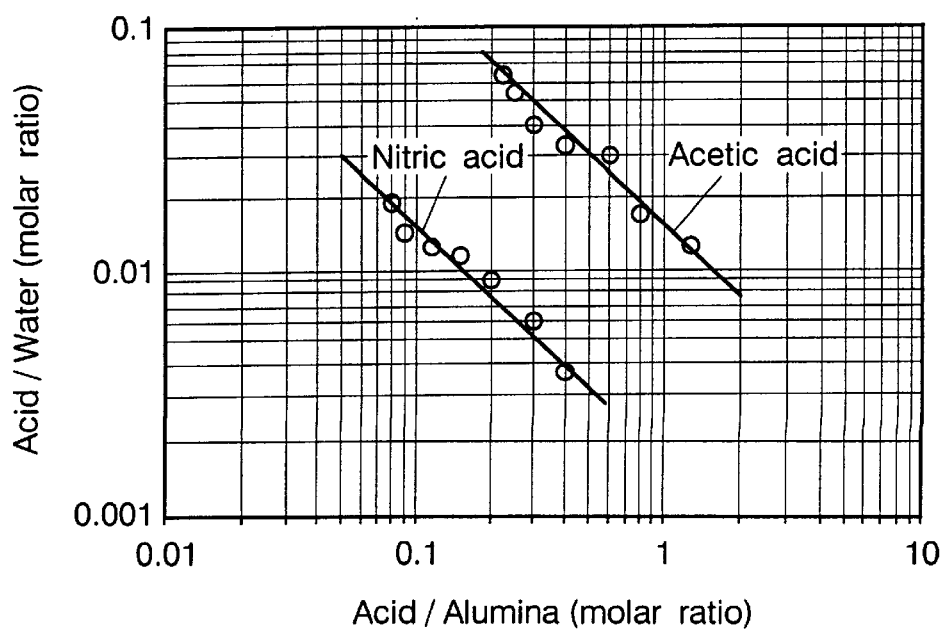
FIG. 4 shows a relation between an alumina/acid/water molar ratio and an optimum light transmittance.

As can be seen from the results shown in FIGS. 1 to 3, the preferred aqueous sol boehmite fibers have a correlation to not only the acid/alumina molar ratio (b/a) but also the acid concentration. The acid concentration is expressed in an acid/water molar ratio (b/c), and the highest values of the light transmittance curves in FIGS. 1 to 3 were plotted to obtain FIG. 4. In FIG. 4, the acid/alumina molar ratio (b/a) is plotted as abscissa and the acid/water molar ratio (b/c) as ordinate by log-log graph.

When the nitric acid was used, the highest values of the light transmittance curves of 1% dilute sol of the synthesized products obtained in alumina concentrations of 5%, 10%, 20%, 30%, 40%, 50% and 56% corresponded to nitric acid/alumina molar ratios of 0.4, 0.3, 0.2, 0.15, 0.11, 0.09 and 0.08, respectively, and the acid/water molar ratios calculated therefrom were 0.0038, 0.0060, 0.0091, 0.012, 0.014, 0.017 and 0.019, respectively. These values were plotted to obtain a straight line inclining from upper left to lower right and having an inclination angle of 45° as shown in FIG. 4. The straight line means that the product of the acid/alumina molar ratio plotted as abscissa and the acid/water molar ratio plotted as ordinate is a constant value. This constant value was 0.0015 in case of the nitric acid, and it was 0.015 in case of the acetic acid.

Accordingly, it has become apparent that a preferred alumina sol having a high light transmittance can be obtained by determining mixing conditions about the amounts of alumina, an acid and water using the product in the synthesis of an alumina sol.

A formula to calculate the optimum amount of an acid for obtaining a preferred aqueous sol boehmite fiber in each concentration was sought from FIG. 4. When the chemical composition is represented by $aAl_2O_3 \cdot bHA \cdot cH_2O$ described herein satisfy the following relation:

$$k=(b/a)\cdot(b/c), \text{ or } b^2=k\cdot a\cdot c.$$

The k value is a value inherent in an acid. When the acid was an inorganic monobasic acid such as hydrofluoric acid, hydrochloric acid, bromic acid, iodic acid or nitric acid, or an acid produced by dissociation of its aluminum salt, the k value was in the range of 0.0001 to 0.01, preferably 0.0005 to 0.005. When the acid was a lower aliphatic monocarboxylic acid such as formic acid, acetic acid or propionic acid, or an acid produced by dissociation of its aluminum salt, the k value was in the range of 0.002 to 0.2, preferably 0.005 to 0.05. There was no clear difference in the k value between the hydrochloric acid and the nitric acid, both being inorganic monobasic acids. There was a slight difference between the formic acid, the acetic acid and the propionic acid, all being lower aliphatic acids. About the magnitude of the k value, the order was formic acid<acetic acid<propionic acid. It has become apparent that the k value can be used as a calculation indication to obtain a preferred alumina sol, no matter how the alumina concentration is, and that the k value is a variable of the alumina concentration in the preparation and the type of an acid, independent of particle size of alumina exhibiting ρ- and χ-crystal structures, mixing ratio between the starting alumina materials, and temperature or time of the hydrothermal treatment.

With decrease of the k value, the light transmittance of the resulting aqueous sol was lowered, the form of the produced boehmite tended to be varied from fiber to flake or plate, and the amount of water of crystallization was decreased. With increase of the k value, the light transmittance of the resulting aqueous sol was lowered, the produced boehmite tended to be in the form of agglomerates of short fibers, and the amount of water of crystallization was increased. When the k value was further decreased or increased, the k value fell out of the production region of an aqueous alumina sol, and the amount of a precipitable suspended material having the same boehmite structure became large, so that a boundary between the region designated by the invention and the precipitable suspended material region was able to be defined.

By optionally selecting a mixing ratio between the starting alumina materials, an alumina concentration and a temperature or time of the hydrothermal treatment under the preferred conditions of the k value, the diameter and the fiber length of the boehmite fibers were able to be relatively freely varied, but the pore structure of the resulting alumina forming product depended on the diameter and the fiber length of the boehmite fibers in the alumina sol used. That is, short fibers gave a small pore volume, long fibers gave a large pore volume, thin fibers gave a large specific surface area, and thick fibers gave a small specific surface area. The fibrous boehmite having a high light transmittance gave a sharp pore distribution. The fibrous boehmite slightly agglomerated gave a bimodal type pore structure. The fibrous boehmite greatly agglomerated gave a small micropore volume of pores having a pore diameter of less than 60 nm, a large macropore volume of pores having a pore diameter of not less than 60 nm, and a low strength.

The alumina forming product obtained from fibrous boehmite having a fiber length of 50 to 100 nm was on a low level in the pore volume of pores having a pore diameter of less than 60 nm. The alumina forming product obtained from fibrous boehmite having a fiber length of 100 to 500 nm was on a middle level in the pore volume, namely, it had a weight mean pore volume of 0.6 ml/g to 0.8 ml/g. The alumina forming product obtained from fibrous boehmite having a fiber length of not shorter than 500 nm had a large pore volume. In order to obtain a large pore volume and a sharp pore distribution, it was preferable to conduct hydrothermal treatment at a low temperature of lower than 120° C.

When the k value was small or large, a precipitable suspended material having a low light transmittance was produced, and the suspended material was composed of crystalline ultrafine particles. The forming product obtained from the ultrafine crystal agglomerates had such a pore structure that the micropore volume of pores having a pore diameter of less than 60 nm was small and the macropore volume of pores having a pore diameter of not less than 60 nm was large. Moreover, the mechanical strength of the forming product was low. Therefore, such forming product was unsuitable as an adsorbent or a catalyst carrier.

When alumina exhibiting ρ- and χ-crystal structures was used singly as the starting alumina, the diameter of the boehmite fibers in the aqueous sol tended to be small, the fiber length thereof tended to be long, and the mean pore diameter became small. In contrast, with increase of the amount of gibbsite or calcined χ-alumina, the diameter of the boehmite fibers in the aqueous sol became large, and the specific surface area of the resulting alumina forming product became small.

It was possible that the alumina sol synthesized by the process of the invention was dried at 110° C. to solidify it and the resulting solid was pulverized in a mortar and dispersed again in water or a polar organic material. The alumina sol obtained by redispersing had a viscosity lower than that of the alumina sol before dried, and it was almost free from viscosity change with time. Besides, it showed a slightly higher light transmittance. However, with the increase of the drying temperature, the light transmittance after dispersing in an acid was lowered, the amount of the precipitate was increased, and the reversible redispersibility was lowered. In the forming product obtained by varying the drying temperature to 150–200° C., the macropore volume was increased, and a bimodal type pore structure was obtained.

Next, the forming process is described.

The alumina sol obtained by the hydrothermal reaction or the aqueous sol obtained by dispersing reversibly redispersible xerogel alumina in water are each a weakly acidic sol having a pH value of 3 to 4. Examination of a relation between the pH value and the viscosity resulted in that the viscosity abruptly increased when the pH value was in the range of 4 to 8, and when the pH value was not less than 8, all sols were converted to hydrogels. Under the conditions of a small boehmite fiber diameter, a long boehmite fiber length and a high concentration, the viscosity was increased on the low pH side. Under the conditions of a large boehmite fiber diameter, a short boehmite fiber length and a low concentration, the viscosity was increased on the high pH side. When the pH value was not less than 8, all of sols and sol-like materials had such properties that they were converted to hydrogels, and a three-dimensional network was able to be formed by adding ammonia water to the sols and thereby increasing the pH value. The hydrogels thus obtained were analogous to a hydrogel produced for comparison by the hydrolysis method in appearance and color not but in plasticity.

As the chemical reagents to increase the pH value of the weakly acidic sol or sol-like material to 4 to 11, not only ammonia but also ammonium carbonate, caustic soda and sodium carbonate were available, provided that they were capable of being removed by washing in the later step.

Then, properties of the alumina forming products were compared.

The following three forming processes were conducted.

In the first forming process, the alumina sol was made weakly basic by the use of ammonia water and then formed into an alumina forming product.

In the second forming process, the weakly acidic alumina sol was per se formed into an alumina forming product.

In the third forming process, the weakly acidic alumina sol was per se formed into an alumina forming product and the forming product was then contacted with ammonia gas.

The alumina forming products obtained by the above three processes were dried, then calcined at 560° C. for 2 hours, and measured on the pore structure and compressive crushing strength. As a result, the forming products of the first and the third processes were larger in the pore volume of pores having a pore diameter of less than 60 nm than the forming product of the second process by about 0 to 20%. About the crushing strength of the forming product, the order was the second process>the third process>the first process. The reason is presumably that the fibrous boehmite is orientated lengthwise along the flow at the nozzle position of the extruder to form a coordination structure having resistance to compressive crush.

The conditions suitable for synthesizing an alumina sol useful for a hydrogenation catalyst for petroleum refining were an alumina concentration of 35 to 45% and a hydrothermal treatment temperature of 110 to 120° C. The alumina sol synthesized under these conditions proved to have plasticity, low extrusion pressure and extrusible concentration of relatively wide range. The green extrusion forming product had sufficient green strength.

The green extrusion forming product was contacted with ammonia gas for several hours and then dried. During the drying, no cracking occurred. The product was then heat treated at a temperature of 550 to 600° C. to obtain a forming product of γ-alumina. The forming product was washed with a dilute acid to remove $Na_2O$ slightly contained in the product, dried again, then impregnated with an aqueous solution of a salt of molybdenum or tungsten of Group 6A or nickel of cobalt of Group 8 of the periodic table, dried again and calcined, to obtain a hydrogenation catalyst. The catalyst thus obtained had such a pore structure that the pore volume of pores having a pore diameter of less than 60 nm was large, the macropore volume of pores having a pore diameter of not less than 60 nm was small, the mean pore diameter was about 10 nm, and the pore distribution was sharp. This catalyst proved to have sufficiently high compressive crushing strength and to be almost free from fragment or powder arisen by the abrasion test.

The present invention is further described with reference to the following examples.

EXAMPLE 1

Figure 5:
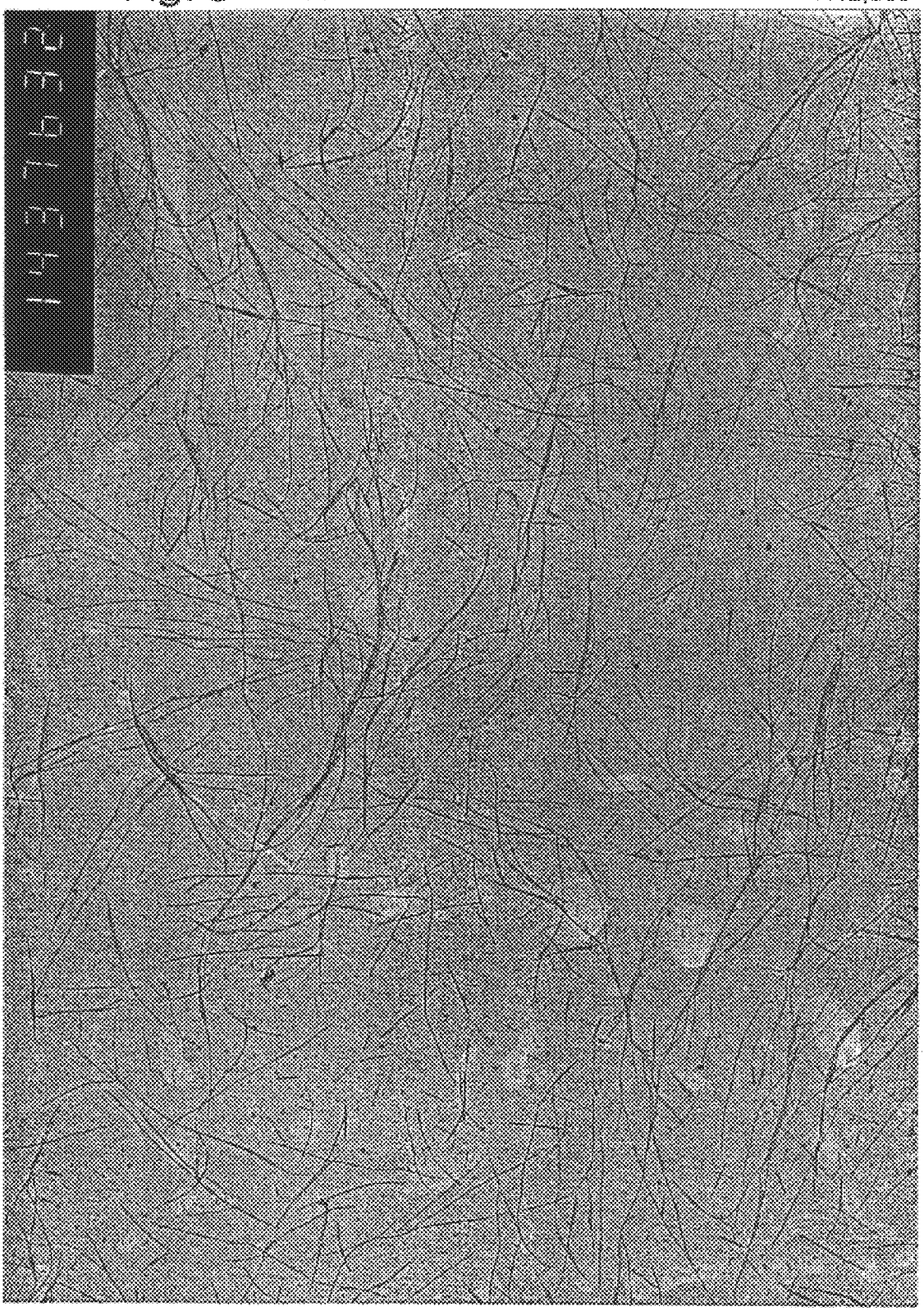
FIG. 5 is a transmission electron photomicrograph of a synthetic alumina sol of Example 1 in 42,000 magnifications.
Figure 6:
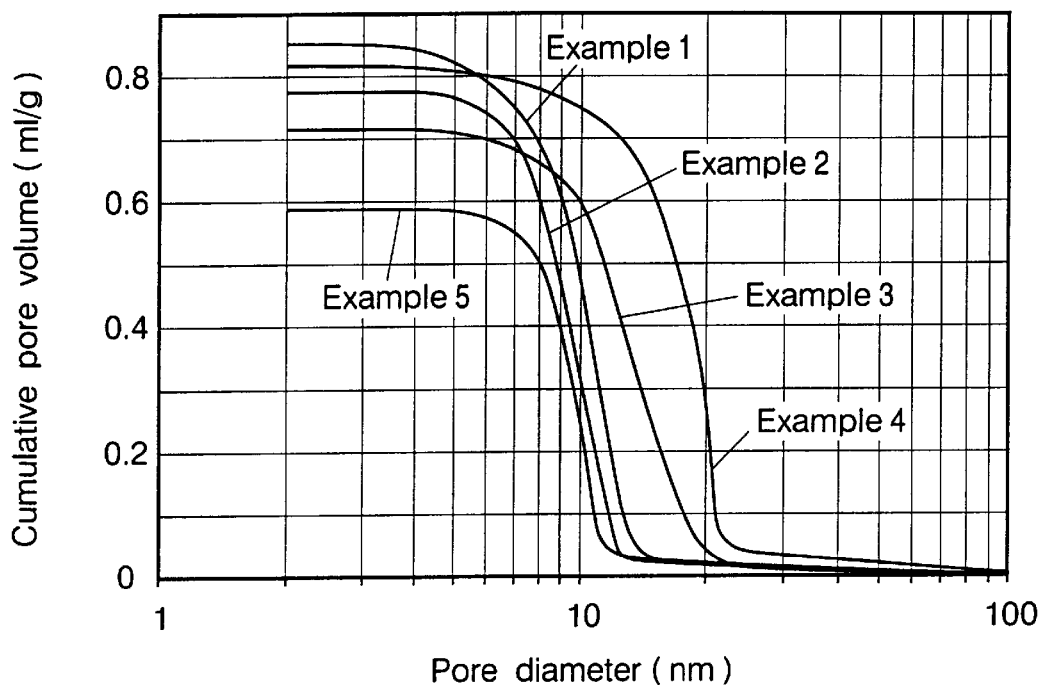
FIG. 6 shows a pore distribution curve of alumina.

To 1,016 ml of ion-exchanged water, 56 g of acetic acid was added, and then 128 g of alumina containing 94% of $Al_2O_3$ (mean particle diameter: 12 μm), having rehydration properties and exhibiting ρ- and χ-crystal structures was added to prepare a reactant. The reactant had an alumina concentration of 10%, an acid/alumina molar ratio (b/a) of 0.80, an acid/water molar ratio (b/c) of 0.0165 and a k value of 0.0132. The reactant was charged to a rotary type autoclave placed in a temperature-controlled air bath, and was subjected to hydrothermal treatment at 98° C. for 360 hours and then at 125° C. for 48 hours, with rotating the autoclave. As a result, a semitransparent alumina sol was produced. The measurement of light transmittance of the alumina sol, which was diluted with ion-exchanged water to have a concentration of 1%, at 570 nm resulted in 78%. The semitransparent alumina sol was observed by a transmission electron microscope, and the result is shown in FIG. 5. FIG. 5 is a transmission electron photomicrograph of 42,000 magnifications. Further, the amount of water of crystallization was measured. As a result, the reaction product was fibrous boehmite having a molecular formula $Al_2O_3 \cdot 1.18H_2O$, a weight mean diameter of 4 nm and a weight mean fiber length of 2 μm. To the alumina sol was added ammonia water to convert it to a hydrogel. The hydrogel was dehydrated under pressure and formed into a cylindrical forming product of 1 m/mØ. The forming product was dried and then calcined at 560° C. to obtain an alumina forming product. Specific surface area, pore volume, etc. of the alumina forming product were measured. The results are set forth in Table 1. The pore distribution curve is shown in FIG. 6.

In Table 1, the amount of water of crystallization is expressed in molar ratio, and the diameter and the fiber

19 length are both expressed as weight mean values. The pore volume of pores having a pore diameter of less than 60 nm is set forth in the α column, and the pore volume of pores having a pore diameter of not less than 60 nm is set forth in the β column.

EXAMPLE 2

To 560 ml of ion-exchanged water, 68 g of acetic acid was added, and then 372 g of the same alumina as used in Example 1 was added to prepare a reactant. The reactant had an alumina concentration of 35%, an acid/alumina molar ratio (b/a) of 0.33, an acid/water molar ratio (b/c) of 0.035 and a k value of 0.0116. The reactant was subjected to hydrothermal treatment at 115° C. for 72 hours in the same manner as in Example 1. From the light transmittance measured in a concentration of 1% and the amount of water of crystallization, a molecular formula of the reaction product was determined in the same manner as in Example 1. The reaction product was fibrous boehmite having a light transmittance of 75% in a concentration of 1%, a molecular formula $Al_2O_3 \cdot 1.16H_2O$, a weight mean diameter of 6 nm and a weight mean fiber length of 200 nm. The viscosity of the alumina sol in a 10% concentration was 40 mPa.s. To the alumina sol was added ammonia water to convert it to a hydrogel. Without performing dehydration under pressure, the hydrogel was formed into a cylindrical forming product of 1 m/mØ by means of an extruder. The forming product was dried and then calcined at 560° C. to obtain an alumina forming product. The results of measurements of specific surface area, pore volume, etc. of the alumina forming product are set forth in Table 1. The pore distribution curve is shown in FIG. 6.

EXAMPLE 3

To 636 ml of ion-exchanged water, 45.5 g of nitric acid having a specific gravity of 1.38 was added, and then 319 g of the same alumina as used in Example 1 was added to prepare a reactant. The reactant had an alumina concentration of 30%, an acid/alumina molar ratio (b/a) of 0.15, an acid/water molar ratio (b/c) of 0.0118 and a k value of 0.0018. The reactant was subjected to hydrothermal treatment at 135° C. for 36 hours in the same manner as in Example 1, to synthesize an alumina sol. The results of property measurements of the alumina sol and an alumina forming product obtained from the alumina sol in the same manner as in Example 2 are set forth in Table 1. The pore distribution curve is shown in FIG. 6.

EXAMPLE 4

To 547 ml of ion-exchanged water, 61.7 g of acetic acid was added, and then 160 g of the same alumina as used in Example 1 and 231 g of gibbsite having a mean particle diameter of 2.5 μm and a low water content were added to prepare a reactant. The reactant had an alumina concentration of 30%, an acid/alumina molar ratio (b/a) of 0.35, an acid/water molar ratio (b/c) of 0.029 and a k value of 0.010. The reactant was subjected to hydrothermal treatment at 150° C. for 24 hours in the same manner as in Example 1, to synthesize an alumina sol. The alumina sol in a weakly acidic state was per se formed into a cylindrical forming product of 1 m/mØ by means of an extruder. With keeping the weakly acidic state, the forming product was dried and then calcined at 560° C. to obtain an alumina forming product. The results of property measurements of the alumina sol and the alumina forming product are set forth in Table 1. The pore distribution curve is shown in FIG. 6.

20

EXAMPLE 5

To 81.1 ml of warmed ion-exchanged water, 12.9 g of acetic acid was added, and then 106 g of the same alumina as used in Example 1 was added to prepare a reactant. The reactant had an alumina concentration of 50%, an acid/alumina molar ratio (b/a) of 0.22, an acid/water molar ratio (b/c) of 0.045 and a k value of 0.010. The reactant was heated at 80° C. for 1 hour to give a viscous liquid wherein no starting alumina powder was precipitated. Then, the viscous liquid was charged into a heat-resistant vessel and was subjected to hydrothermal treatment at 125° C. for 48 hours under a gauge pressure of 1.4 kg/cm$^2$ in a steam atmosphere, to synthesize an alumina sol. The results of property measurements of the alumina sol and an alumina forming product obtained from the alumina sol in the same manner as in Example 2 are set forth in Table 1. The pore distribution curve is shown in FIG. 6.

EXAMPLE 6

The alumina sol obtained in Example 2 was dried at a temperature of 110 to 215° C. to obtain xerogel alumina separated from the mother liquor and the free acetic acid. The xerogel alumina was pulverized and dispersed again in water. The resulting alumina sol with a concentration of 10% had a viscosity of 20 mPa.s, and this viscosity value was a half of the viscosity value of the alumina sol synthesized. Though the alumina sol was allowed to stand, viscosity increase did not take place. Xerogels were prepared in the same manner as above except for varying the drying temperature, and the xerogels were again dispersed in water to prepare alumina sols. The light transmittances of the thus prepared alumina sols and the amounts of precipitates in the alumina sols are set forth in Table 2.

As can be seen from Table 2, with the increase of the drying temperature, the light transmittance was lowered, the amount of precipitate was increased, and the alumina sol lost reversibility. Due to this fact, low-temperature drying proved to be preferable.

EXAMPLE 7

Figure 7:
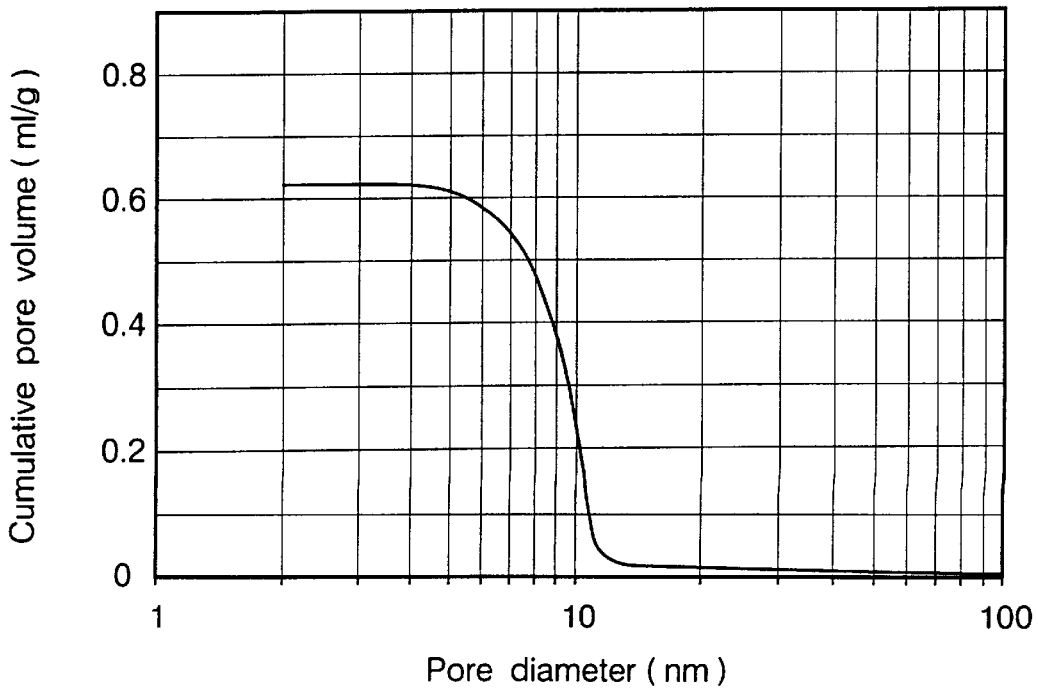
FIG. 7 shows a pore distribution curve of a hydrogenation catalyst.

The alumina sol in a weakly acidic state obtained in Example 2 was per se formed into a cylindrical forming product of 1 m/mØ by means of an extruder. The forming product was placed in a closed vessel containing ammonia gas for several hours to neutralize it, then dried at 140° C. and calcined at 560° C. to obtain an alumina forming product. The alumina forming product was washed with water to remove a slight amount of $Na_2O$ contained therein. Then, the product was impregnated with an aqueous solution of nickel nitrate, cobalt nitrate and ammonium molybdate, said metals being active metals, in the conventional manner to obtain a hydrogenation catalyst wherein 1.5% of NiO, 1.5% of CoO and 12.5% of $MoO_3$ were supported. As for the properties of the catalyst, the specific surface area was 202 m$^2$/g, the pore volume of pores having a pore diameter of less than 60 nm was 0.62 ml/g, and the pore volume of pores having a pore diameter of not less than 60 nm was 0.01 ml/g. The pore distribution curve of the catalyst is shown in FIG. 7. Separately, a catalyst of the same composition was prepared from an alumina carrier prepared by way of trial referring to Example 1 of the aforesaid Publication No. 12. The catalyst was compared with the hydrogenation catalyst of Example 7 in the compressive crushing strength. As a result, the hydrogenation catalyst of Example 7 had a strength 1.4 times as much as that of the catalyst of Publication No. 12.

The following has become apparent from Table 1, FIG. 6 and FIG. 7.

With respect to the alumina sol obtained in Example 1, fibrous boehmite of thin and long fibers was produced over a long period of time, and an alumina forming product having a large pore volume of pores having a pore diameter of less than 60 nm was obtained.

The alumina sol obtained in Example 2 had a concentration suitable for extrusion forming, and the alumina forming product had a specific surface area, a pore volume and a pore distribution all favorable for a hydrogenation catalyst carrier. The pore distribution curve of the active metal-impregnated catalyst obtained in Example 7 is shown in FIG. 7, and the curve is steep at a pore diameter of about 12 nm, that is, the catalyst of Example 7 was one having an extremely small pore volume of pores having a pore diameter of not less than 12 nm.

With respect to the alumina sol synthesized by the use of nitric acid in Example 3, the diameter of boehmite fibers tended to become large and the pore distribution tended to become broad.

When gibbsite was used as a starting alumina in Example 4, the diameter of boehmite fibers tended to become large, and the forming product produced from the weakly acidic sol hardly shrank in the drying step and had a large pore volume though it was acidic.

In Example 5, the alumina concentration was 50%, and the boehmite particles proved to be thick and short, in contrast with those of Example 1.

Comparative Example 1

To 60.7 ml of ion-exchanged water, 2.1 g of acetic acid was added, and then 37.2 g of the same alumina exhibiting ρ- and χ-crystal structures as used in Example 1 was added to prepare a reactant. The reactant had an alumina concentration of 35%, an acid/alumina molar ratio (b/a) of 0.10, an acid/water molar ratio (b/c) of 0.010 and a k value of 0.001. The reactant was subjected to hydrothermal treatment at 125° C. for 56 hours in the same manner as in Example 1. The obtained product was a cloudy suspension, and the suspended material was heavy boehmite which was dispersible in water and easily precipitable. This suspension was not converted to a hydrogel even by adding ammonia. The results of property measurements of the suspended material and its forming product are set forth in Table 3.

Comparative Example 2

To 38.1 ml of ion-exchanged water, 24.7 g of acetic acid was added, and then 37.2 g of the same alumina exhibiting ρ- and χ-crystal structures as used in Example 1 was added to prepare a reactant. The reactant had an alumina concentration of 35%, an acid/alumina molar ratio (b/a) of 1.20, an acid/water molar ratio (b/c) of 0.184 and a k value of 0.22. The reactant was subjected to hydrothermal treatment at 125° C. for 56 hours in the same manner as in Example 1. The obtained product was a cloudy suspension, and the suspended material was light boehmite which was dispersible in water and easily precipitable. The results of property measurements of the suspended material and its forming product are set forth in Table 3.

Comparative Example 3

To 52.9 ml of ion-exchanged water, 15.2 g of nitric acid having a specific gravity of 1.38 was added, and then 31.9 g of the same alumina exhibiting ρ- and χ-crystal structures as used in Example 1 was added to prepare a reactant. The reactant had an alumina concentration of 30%, an acid/alumina molar ratio (b/a) of 0.50, an acid/water molar ratio (b/c) of 0.044 and a k value of 0.022. The reactant was subjected to hydrothermal treatment at 125° C. for 56 hours in the same manner as in Example 1. The obtained product was a cloudy suspension, and the suspended material was light boehmite which was dispersible in water and easily precipitable. The results of property measurements of the suspended material and its forming product are set forth in Table 3.

From the results of Comparative Examples 1 to 3, it can be seen that when the k value was out of the range of the claim, no preferred alumina sol was obtained, the reaction product was a cloudy suspension, the amount of water of crystallization was not preferable, the pore volume of pores having a pore diameter of less than 60 nm was small, and the pore volume of pores having a pore diameter of not less than 60 nm was large. Further, because of low mechanical strength, the forming products were not practical.

EXAMPLES 8–26

Many kinds of alumina sols were prepared using alumina having rehydration properties and exhibiting ρ- and χ-crystal structures and calcined χ-alumina as the starting alumina materials and using acids and aluminum salts shown in Tables 4 and 5. Preparation of the reactants, operation of the hydrothermal treatment, forming and property measurements were made in accordance with Examples 1, 2, 4 and 7. The acid/alumina molar ratio, the acid/water molar ratio and the temperature and time of the hydrothermal treatment were varied as shown in Tables 4 and 5. To each of the alumina sols was added ammonia water to convert it to a hydrogel. The hydrogel was extruded, dried and then calcined at 560° C., to obtain an alumina forming product. The pore volume of pores having a pore diameter of less than 60 nm and the pore volume of pores having a pore diameter of not less than 60 nm were measured. The k value was calculated from the acid/alumina molar ratio and the acid/water molar ratio. The results are set forth in Table 4 and Table 5.

The following has become apparent from Table 4 and Table 5.

Examples 8 to 13 relate to types of acids and mixed acids. In the syntheses of alumina sols, the acids of the claim were used in amounts determined from the k values, whereby alumina sols capable of providing alumina forming products having preferable pore structures were obtained.

Examples 14 to 16 relate to types of monobasic acid salts of aluminum. Alumina sols almost identical with those obtained by the use of the same acids as made by dissociation of the salts were obtained.

Examples 25 and 26 relate to influences of the mixing ratio of the calcined χ-alumina. The calcined alumina was used in the mixing ratio shown in Table 5, and the hydrothermal treatment was carried out by heating the alumina sol at 110° C. for 120 hours and then heating it again at 150° C. for 24 hours. The results are set forth in Table 5. With the increase of the mixing ratio of the calcined alumina, the macropores tended to be increased.

In Example 8, Examples 17 to 20, and Examples 1, 2, 5 and 11 using acetic acid, wherein the synthesis was made using a preferred k value, the pore volume of pores having a pore diameter of less than 60 nm was on a high level and the macropore volume of pores having a pore diameter of not less than 60 nm was small, even if the alumina concentration was varied to 10–50%. When the k value in case of nitric acid or acetic acid deviated from the preferred value, the pore volume of pores having a pore diameter of less than 60 nm was decreased and the macropore volume of pores having a pore diameter of not less than 60 nm was increased, as is apparent from Examples 21 to 24.

With increase of the mixing ratio of the calcined alumina, the macropores were increased, and an alumina forming product having a pore distribution of bimodal type was obtained. As is apparent from Examples 25 and 26, an alumina forming product favorable as a carrier of a demetalization catalyst was obtained, and use of the calcined alumina in combination proved to be effective.

Owing to the constitution, of the present invention, there can be obtained an entirely novel fibrous boehmite for forming an alumina sol, said boehmite containing a small amount of excess water inside the crystal lattice and having an extremely long fiber length.

An alumina sol having an extremely high concentration and comprising boehmite containing a small amount of excess water inside the crystal lattice can be synthesized. The alumina sol thus synthesized has excellent mechanical strength and properties particularly favorable for alumina carriers or hydrogenation catalysts, and can be fed to the forming process without subjecting it to a special concentration operation, whereby the productivity can be prominently improved. Since the concentration step is unnecessary, the alumina sol is advantageous in conservation of energy.

A preferred alumina sol can be produced under optimum synthesis conditions according to the intended use such as alumina carrier, and the alumina sol thus produced shows highly improved quality. Owing to the constitution, of the present invention, an alumina forming product, which has higher quality than conventional alumina obtained by hydrolysis method, is advantageous in conservation of resources and is capable of markedly reducing the drain quantity, can be obtained using alumina of $\rho$- and $\chi$-crystal structures and inexpensive gibbsite or the like in combination.

According to one aspect of the invention, stirring and heating are improved, whereby a highly monodisperse alumina sol showing stable quality can be synthesized and an alumina forming product having a sharp pore distribution can be obtained.

According to another aspect of the invention, there can be obtained an alumina forming product, which shows plastic moldability and excellent green strength, is free from cracks caused by shrinkage in the drying and has a moderate pore volume, a sharp pore distribution and high compressive crushing strength.

According to a further aspect of the invention, a hydrogenation catalyst having a moderate pore volume, a sharp pore distribution and high compressive crushing strength can be easily mass produced at a low cost with a small amount of drain. The process for preparing the catalyst is advantageous in conservation of resources.

TABLE 1

| | | Alumina sol | | | | Alumina forming product | | |
|---|---|---|---|---|---|---|---|---|
| | Light trans-mittance | | Amount of water of crystal-lization | Shape of boehmite | | Specific surface | Pore volume | |
| EX | 1.0% % | Crystal form | molar ratio | mean diameter nm | mean length nm | area m²/g | ml/g α | ml/g β |
| 1 | 78 | boehmite | 1.18 | 4 | 2000 | 280 | 0.85 | 0.00 |
| 2 | 75 | boehmite | 1.16 | 6 | 200 | 225 | 0.77 | 0.00 |
| 3 | 34 | boehmite | 1.14 | 9 | 150 | 172 | 0.70 | 0.00 |
| 4 | 18 | boehmite | 1.10 | 15 | 300 | 107 | 0.80 | 0.02 |
| 5 | 62 | boehmite | 1.15 | 8 | 150 | 192 | 0.59 | 0.02 |

α: pore volume of pores having a pore diameter of less than 60 nm.
β: pore volume of pores having a pore diameter of not less than 60 nm.

TABLE 2

| Drying conditions | Transmittance (1.0% liquid)* % | Amount of precipitate (1% liquid 20 hr spontaneous precipitation) |
|---|---|---|
| undried alumina sol | 72 | 0.4 |
| 110° C.-dried xerogel | 75 | 0.4 |
| 135° C.-dried xerogel | 60 | 0.5 |
| 165° C.-dried xerogel | 51 | 0.7 |
| 180° C.-dried xerogel | 40 | 0.8 |
| 195° C.-dried xerogel | 18 | 2.1 |
| 215° C.-dried xerogel | 11 | 4.0 |

*: visible light having a wavelength of 570 nm.

TABLE 3-1

| Compar. Ex. | Type of acid | Alumina concentration % | Acid/Alumina by mol | k value | Appearance |
|---|---|---|---|---|---|
| 1 | Acetic acid | 35 | 0.10 | 0.0008 | suspension |
| 2 | Acetic acid | 35 | 1.50 | 0.22 | suspension |

TABLE 3-1-continued

| Compar. Ex. | Type of acid | Alumina concentration % | Acid/Alumina by mol | k value | Appearance |
|---|---|---|---|---|---|
| 3 | Nitric acid | 30 | 0.50 | 0.022 | suspension |

TABLE 3-2

| Compar. Ex. | Water of crystallization molar ratio | Pore volume pore diameter: less than 60 nm ml/g | Pore volume pore diameter: not less than 60 nm ml/g | Compressive crushing strength |
|---|---|---|---|---|
| 1 | 1.08 | 0.38 | 0.48 | low |
| 2 | 1.36 | 0.40 | 0.32 | low |
| 3 | 1.42 | 0.36 | 0.25 | low |

TABLE 4-1

| Ex. | Type of acid | Type of alumina | Alumina concentration % | Acid/Alumina by mol | k value |
|---|---|---|---|---|---|
| 8 | Nitric acid | Alumina * | 30 | 0.12 | 0.0011 |
| 9 | Hydrochloric acid | Alumina * | 30 | 0.12 | 0.0011 |
| 10 | Formic acid | Alumina * | 30 | 0.27 | 0.0058 |
| 11 | Acetic acid | Alumina * | 30 | 0.35 | 0.0100 |
| 12 | Propionic acid | Alumina * | 30 | 0.40 | 0.0140 |
| 13 | Nitric acid + Acetic acid | Alumina * | 30 | 0.05 0.23 | 0.0064 |
| 14 | Aluminum nitrate | Alumina * | 30 | 0.35 | 0.0010 |
| 15 | Aluminum chloride | Alumina * | 30 | 0.12 | 0.0011 |

TABLE 4-2

| Ex. | Condition of hydrothermal treatment Temperature ° C. | Time hr | Pore volume pore diameter: less than 60 nm ml/g | Pore volume pore diamter: not less than 60 nm ml/g |
|---|---|---|---|---|
| 8 | 115 | 72 | 0.74 | 0.01 |
| 9 | 115 | 72 | 0.76 | 0.00 |
| 10 | 135 | 36 | 0.69 | 0.10 |
| 11 | 125 | 48 | 0.73 | 0.00 |
| 12 | 135 | 36 | 0.68 | 0.01 |
| 13 | 150 | 20 | 0.62 | 0.02 |
| 14 | 125 | 48 | 0.72 | 0.02 |
| 15 | 115 | 72 | 0.75 | 0.01 |

*: alumina having ρ and χ-crystal structures

TABLE 5-1

| Ex. | Type of acid | Type of alumina | Alumina concentration % | Acid/Alumina by mol | k value |
|---|---|---|---|---|---|
| 16 | Aluminum acetate | Alumina * | 30 | 0.35 | 0.0100 |
| 17 | Nitric acid | Alumina * | 10 | 0.30 | 0.0018 |
| 18 | Nitric acid | Alumina * | 20 | 0.20 | 0.0018 |
| 19 | Nitric acid | Alumina * | 40 | 0.11 | 0.0015 |
| 20 | Nitric acid | Alumina * | 50 | 0.08 | 0.0012 |
| 21 | Nitric acid | Alumina.* | 30 | 0.10 | 0.0008 |

TABLE 5-1-continued

| Ex. | Type of acid | Type of alumina | Alumina concentration % | Acid/Alumina by mol | k value |
|---|---|---|---|---|---|
| 22 | Nitric acid | Alumina * | 30 | 0.30 | 0.0074 |
| 23 | Acetic acid | Alumina * | 30 | 0.20 | 0.0032 |
| 24 | Acetic acid | Alumina * | 30 | 0.80 | 0.0610 |
| 25 | Acetic acid | Alumina * 30% Calcined χ-alumina 70% | 30 | 0.40 | 0.0135 |
| 26 | Acetic acid | Alumina * 50% Calcined χ-alumina 50% | 30 | 0.40 | 0.0135 |

TABLE 5-2

| Ex. | Condition of hydrothermal treatment Temperature ° C. | Time hr | Pore volume pore diameter: less than 60 nm ml/g | Pore volume pore diamter: not less than 60 nm ml/g |
|---|---|---|---|---|
| 16 | 125 | 48 | 0.72 | 0.02 |
| 17 | 115 | 72 | 0.74 | 0.03 |
| 18 | 115 | 72 | 0.73 | 0.01 |
| 19 | 125 | 48 | 0.68 | 0.03 |
| 20 | 135 | 36 | 0.58 | 0.02 |
| 21 | 115 | 72 | 0.58 | 0.08 |
| 22 | 115 | 72 | 0.50 | 0.15 |
| 23 | 115 | 72 | 0.55 | 0.10 |
| 24 | 135 | 36 | 0.48 | 0.15 |
| 25 | 110 + 150 | 120 24 | 0.50 | 0.22 |
| 26 | 110 + 150 | 120 24 | 0.63 | 0.05 |

*: alumina having ρ and χ-crystal structures

What is claimed is:

1. A process for producing an alumina sol comprising fibrous crystalline boehmite exhibiting ρ-crystal structure, comprising mixing alumina produced by rapid heating dehydration of aluminum hydroxide with alumina having higher solubility than boehmite in an amount of 0 to 95% by weight in terms of oxide, adding at least one inorganic monobasic acid, and then subjecting the resulting mixture to hydrothermal treatment at a temperature of 70 to 350° C. in the presence of water, said hydrothermal treatment being carried out with stirring accompanied by substantially slight shearing, without stirring or a combination thereof, and said mixture having a chemical composition by mol represented by $aAl_2O_3 \cdot bHA \cdot cH_2O$ wherein HA is a sum of effective acid and a, b and c are numbers satisfying the following relation:

$$k=(b/a)\cdot(b/c)$$

wherein the k value is in the range of 0.0005 to 0.01, and containing alumina in a concentration of 5% to 60% by weight.

2. The process for producing an alumina sol as claimed in claim 1, wherein the inorganic monobasic acid contains at least one acid selected from hydrofluoric acid, hydrochloric acid, nitric acid and acids made by dissociation of their aluminum salts.

3. The process for producing an alumina sol as claimed in claim 1, wherein the alumina having higher solubility than boehmite, that is one starting alumina to be mixed, at least partially comprises one or more substances selected from gibbsite, bayerite, nordstrandite, amorphous hydrated alumina, amorphous alumina, χ-alumina, γ-alumina and η-alumina.

4. The process for producing an alumina sol as claimed in claim 1, wherein the hydrothermal treatment is carried out with stirring accompanied by substantially slight shearing, without stirring, or a combination thereof throughout the treatment except during the period of heating up and the initial period of treatment, and a heating medium set apart from the reactants by a reactor wall comprises a temperature-controlled heating medium.

5. A process for producing an alumina sol comprising fibrous crystalline boehmite exhibiting ρ-crystalline structure, comprising mixing alumina produced by rapid heating dehydration of aluminum hydroxide with alumina having higher solubility than boehmite in an amount of 0 to 95% by weight in terms of oxide, adding at least one lower aliphatic monocarboxylic acid, and then subjecting the resulting mixture to hydrothermal treatment at a temperature of 70 to 350° C. in the presence of water, said hydrothermal treatment being carried out with stirring accompanied by substantially slight shearing, without stirring or a combination thereof, and said mixture having a chemical composition by mol represented by $aAl_2O_3 \cdot bHA \cdot cH_2O$ wherein HA is a sum of effective acid and a, b and c are numbers satisfying the following relation:

$$k=(b/a) \cdot (b/c)$$

wherein the k value is in the range of 0.002 to 0.05, and containing alumina in concentration of 5 to 60% by weight.

6. The process for producing an alumina sol as claimed in claim 5, wherein the lower aliphatic monocarboxylic acid contains at least one acid selected from formic acid, acetic acid, propionic acid and acids made by dissociation of their aluminum salts.

7. The process for producing an alumina sol as claimed in claim 5, wherein the alumina having higher solubility than boehmite, that is one starting alumina to be mixed, at least partially comprises one or more substances selected from gibbsite, bayerite, nordstrandite, amorphous hydrated alumina, amorphous alumina, χ-alumina, γ-alumina and η-alumina.

8. The process for producing an alumina sol as claimed in claim 5, wherein the hydrothermal treatment is carried out with stirring accompanied by substantially slight shearing, without stirring, or a combination thereof throughout the treatment except during the period of heating up and the initial period of treatment, and a heating medium set apart from the reactants by a reactor wall comprises a temperature-controlled heating medium.

* * * * *